(12) United States Patent
Len et al.

(10) Patent No.: US 11,404,209 B2
(45) Date of Patent: Aug. 2, 2022

(54) ELECTRICAL DEVICE PACKAGE STRUCTURE AND MANUFACTURING METHOD THEREOF

(71) Applicant: SFI Electronics Technology Inc., Taoyuan (TW)

(72) Inventors: Ching-Hohn Len, Taoyuan (TW); Hong Zong Xu, Taoyuan (TW); Zhi Xian Xu, Taoyuan (TW); Hsing Tsai Huang, Taoyuan (TW); Jie-An Zhu, Taoyuan (TW)

(73) Assignee: SFI Electronics Technology Inc., Taoyuan (TW)

( * ) Notice: Subject to any disclaimer, the term of this patent is extended or adjusted under 35 U.S.C. 154(b) by 101 days.

(21) Appl. No.: 16/926,324

(22) Filed: Jul. 10, 2020

(65) Prior Publication Data
US 2021/0280373 A1 Sep. 9, 2021

(30) Foreign Application Priority Data
Mar. 6, 2020 (TW) ................................ 109107361

(51) Int. Cl.
*H01G 4/224* (2006.01)
*H01G 4/30* (2006.01)
*H01G 4/232* (2006.01)

(52) U.S. Cl.
CPC ............... *H01G 4/224* (2013.01); *H01G 4/30* (2013.01); *H01G 4/232* (2013.01)

(58) Field of Classification Search
CPC ........... H01G 4/30; H01G 4/12; H01G 4/228; H01G 4/224; H01G 4/232; C04B 35/491
USPC ..... 361/321.1, 301.4, 306.3, 321.3; 29/25.42
See application file for complete search history.

(56) References Cited

U.S. PATENT DOCUMENTS

| | | | | |
|---|---|---|---|---|
| 6,232,867 B1 * | 5/2001 | Yoshida | ............... | H01C 17/285 338/21 |
| 6,278,065 B1 * | 8/2001 | Hopper | ................. | H01C 1/028 257/703 |
| 2005/0229388 A1 * | 10/2005 | Deng | .................... | H01C 17/02 29/621 |
| 2006/0234022 A1 * | 10/2006 | Liu | ........................ | H01G 4/255 428/210 |

* cited by examiner

*Primary Examiner* — Arun Ramaswamy
(74) *Attorney, Agent, or Firm* — Bradley J. Thorson; DeWitt LLP

(57) ABSTRACT

An electrical device package structure and manufacturing method thereof is disclosed. The manufacturing method comprises: providing an electrical device body having at least two electrodes, wherein an outer surface of the electrical device body is partially covered by the electrodes, and outer surfaces of the electrodes are covered by a plastic material; forming a first protective layer including phosphate salt at least on the exposed outer surface of the electrical device body; and forming a second protective layer including glass at least on an exposed outer surface of the first protective layer. The present invention can prevent the electrical device body and/or the electrodes from being damaged on their manufacturing process, and avoid a forming high impedance layer on an electrode.

13 Claims, 4 Drawing Sheets

ELECTRICAL DEVICE PACKAGE STRUCTURE AND MANUFACTURING METHOD THEREOF

CROSS-REFERENCE TO RELATED APPLICATION

This application claims the priority benefit of Taiwan Application No. 109107361, filed on Mar. 6, 2020. The entirety of the above-mentioned patent application is hereby incorporated by reference herein and made a part of this specification.

BACKGROUND OF THE INVENTION

Field of the Invention

The present invention relates to a field of electrical device package, and more particularly, to an electrical device package structure and manufacturing method thereof.

BACKGROUND

In a conventional electrical device packaging process, since there is no end plastic at both faces of an electrode, and the electrode is dipped in phosphate salt and is reacted with the electrical device to form zinc phosphate, so discontinuity of inside and outside connection is caused. Furthermore, depending a pattern of zinc phosphate accumulation, perforations that looks like a net are formed on the surface to easily cause leaks of electroplating solution ending up with increase of electrical device defect rate.

In view of this, an electrical device package structure and manufacturing method is proposed by the present invention to address the aforementioned shortcomings and other problems like a high impedance layer formed on an electrode.

SUMMARY OF THE INVENTION

The present invention provides a manufacturing method for electrical device package structure, comprising: providing an electrical device body having at least two electrodes, wherein an outer surface of the electrical device body is partially covered by the electrodes, and outer surfaces of the electrodes are covered by a plastic material; forming a first protective layer including phosphate salt at least on the exposed outer surface of the electrical device body; and forming a second protective layer including glass at least on an exposed outer surface of the first protective layer.

The manufacturing method for electrical device package structure of the present invention, further comprises after forming the first protective layer including phosphate salt at least on the exposed outer surface of the electrical device body, removing the plastic material.

The manufacturing method for electrical device package structure of the present invention, further comprises after forming the second protective layer including glass at least on the exposed outer surface of the first protective layer, performing electroplating on the exposed outer surfaces of the electrodes.

In the manufacturing method for electrical device package structure of the present invention, a pre-formed layer of the first protective layer is formed through dipping, spraying, coating or combination thereof by a solution including phosphate salt.

In the manufacturing method for electrical device package structure of the present invention, after forming the pre-formed layer of the first protective layer through dipping, spraying, coating, spin coating or combination thereof by a solution including phosphate salt, the pre-formed layer of the first protective layer is processed with 700° C. to 800° C. to form the first protective layer and remove the plastic material.

In the manufacturing method for electrical device package structure of the present invention, a pre-formed layer of the second protective layer is formed through dipping, spraying, coating, spin coating or combination thereof by a solution including glass.

In the manufacturing method for electrical device package structure of the present invention, the phosphate salt is at least one of phosphate, zinc phosphate, iron phosphate and manganese phosphate.

The present invention further provides another manufacturing method for electrical device package structure, comprising: providing an electrical device body having at least two electrodes, wherein an outer surface of the electrical device body is partially covered by the electrodes, and outer surfaces of the electrodes are covered by a plastic material; and forming a protective layer including glass at least on the exposed outer surface of the electrical device body.

The manufacturing method for electrical device package structure of the present invention, further comprises after forming the protective layer including glass at least on the exposed outer surface of the electrical device body, removing the plastic material.

In the manufacturing method for electrical device package structure of the present invention, after forming the pre-formed layer of the protective layer through dipping, spraying, coating, spin coating or combination thereof by a solution including glass, the pre-formed layer of the protective layer is processed with 600° C. to 800° C. to form the protective layer and remove the plastic material.

The manufacturing method for electrical device package structure of the present invention, wherein the glass is at least one of silicate glass, aluminum silicate glass, borate glass, phosphate glass and plumbate glass.

The present invention provides an electrical device package structure, comprising: an electrical device body having at least two electrodes which partially cover an outer surface of the electrical device body; a first protective layer including phosphate salt, which is at least partially formed on the surface uncovered by the electrodes of the electrical device body; and a second protective layer including glass, which is formed on the first protective layer. Otherwise, a surface electrode structure is formed on at least one of the electrodes.

The present invention further provides another electrical device package structure, comprising: an electrical device body having at least two electrodes which partially cover an outer surface of the electrical device body; and a protective layer including glass, which is at least partially formed on the surface uncovered by the electrodes of the electrical device body. Otherwise, a surface electrode structure is formed on at least one of the electrodes.

Compared to a conventional technology, the prevent invention can provide a productive layer including glass formed on a productive layer including phosphate salt, or a productive layer sticking on the electrical device body, to protect the electrical device body and/or the electrodes more preferably. And the plastic material can provide protection for the electrodes and avoid forming a high impedance layer on an electrode when forming each protective layer. Furthermore, the plastic material can be easily removed when performing thermal treatment. Therefore, the present invention can prevent damages to the electrical device body and/or the electrodes on their manufacturing process in the conventional technology.

DESCRIPTION OF EMBODIMENTS

In order to fully understand the objectives, features and technical effects of the present invention, the present invention is explained in details by way of various embodiments below in conjunction with the attached drawings.

Figure 1:
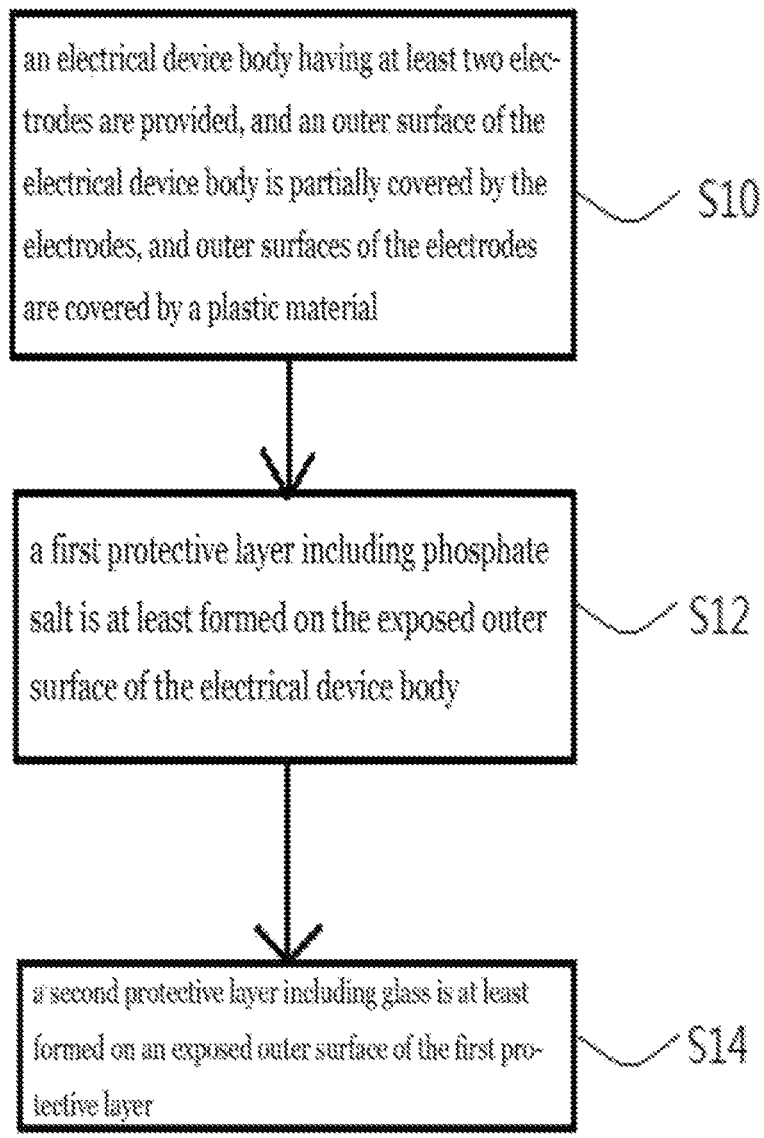
FIG. 1 is a flow diagram illustrating a manufacturing method for electrical device package structure of the present invention.

As shown in FIG. 1, it is a flow diagram illustrating a manufacturing method for electrical device package structure of the present invention. The manufacturing method for electrical device package structure can include step S10 to step S14. In the S10, an electrical device body having at least two electrodes can be provided, and an outer surface of the electrical device body is partially covered by the electrodes, and outer surfaces of the electrodes are covered by a plastic material.

Particularly, the electrical device body can be with resistance or capacitance, and the electrical device body can have a first inner electrode set and a second inner electrode set intersectionally disposed in a dielectric material. The first inner electrode set can be electrically connected with one of the electrodes, and the second inner electrode set can be electrically connected with another electrode. However, if the electrical device body have more electrodes, a quantity of electrode or a connection pattern thereof can be changed. The dielectric material can be composed by metal oxide or aluminium oxide which are mainly zinc oxide. Wherein, the dielectric material can be moulded by a conventional ceramic material sinter moulding technique, before performing a manufacturing process like conventional ceramics sinter moulding technique and adding other metal oxide as an additive. The first inner electrode set and/or the second inner electrode set can both be a silver layer (Ag) or can both be an alloy layer including silver (Ag) and palladium (Pd), but the prevent invention is not limited to this. In other words, in other embodiments the first inner electrode set and the second inner electrode set can be copper (Cu), gold (Au), platinum (Pt), etc., or can include a proper dose of glassy. Furthermore, the metal oxide can be substituted by metal organic salt or metal inorganic salt.

For example, the plastic material can be composed by an acrylic acid polymer, a polyester polymer, an epoxy resin polymer or other organic polymer with photoresistance or capable of being a productive layer, etc., other insoluble powder and a proper dose of additive.

In the S12, a first protective layer including phosphate salt can at least be formed on the exposed outer surface of the electrical device body. Because the electrodes are covered by the plastic material, so when the first protective layer is formed, the electrodes are not eroded by material including phosphate salt, or any material including phosphate salt with high impedance are not formed on the electrodes.

Particularly, the phosphate salt can be at least one of phosphate, zinc phosphate, iron phosphate and manganese phosphate, and a pre-formed layer of the first protective layer can be formed through dipping, spraying, coating or combination thereof by a solution including phosphate salt. For example, a concentration ratio of the phosphate salt can be set to 100:1-20% (pure water: phosphate salt) to prepare the solution including phosphate salt. Then the electrical device body can be dipped into the solution including phosphate salt, and the solution including phosphate salt, for example, can generate zinc phosphate by reacting with the electrical device body to form a high impedance layer, while the plastic material can not react with the phosphate salt. Taking a zinc phosphate salt protective layer as an example, it can be formed by transition elemental ions (e.g. iron ions) substituting a portion of zinc ions in zinc phosphate. More particularly, a method to form the first protective layer including phosphate salt on the electrical device body can be: maintaining a phosphate salt solution under high temperature to form a supersaturated solution so that a phosphate salt sediment is precipitated; and then depositing the phosphate salt sediment on the electrical device body.

Otherwise, after performing the step S12 the plastic material can be removed by, for example, a mechanical method, a chemical method or a physical method. Particularly, the pre-formed layer of the first protective layer can be processed with 700° C. to 800° C. and then the plastic material can be removed. More particularly, after the pre-formed layer of the first protective layer is formed through dipping, spraying, coating, spin coating or combination thereof by a solution including phosphate salt, the pre-formed layer of the first protective layer can be processed with 700° C. to 800° C. to form the first protective layer and remove the plastic material. Therefore, zinc phosphate etc. is more solid or hard through a high-temperature. However, phosphate salt may be perforated so that the electrical device body and/or the electrodes may be damaged by an electroplating solution etc. in a subsequent process.

In the S14, a second protective layer including glass can at least be formed on the exposed outer surface of the first protective layer. Particularly, the glass can be at least one of silicate glass, aluminum silicate glass, borate glass, phosphate glass, plumbate glass and other inorganic acid salt glass. Before performing a step S30 a covering material can be formed on the exposed electrodes. Particularly, a pre-formed layer of the second protective layer can be formed through dipping, spraying, coating, spin coating or combination thereof by a solution including glass. More particularly, the electrical device body chip can be dipped into a solution of inorganic glass, and after drying the electrical device body chip can be dipped repeatedly so that the inorganic glass layer obtains enough thickness to endure erosion of an electroplating object. Alternatively, inorganic glass in an aqueous solution state can be prepared and inclusion of which can be exemplified by glass powder, adhesive, organic solvent, etc., and then spraying method can be performed to spray the inorganic glass aqueous solution to the electrical device body while rolling the electrical device body slowly to spray layer by layer. After that, the pre-formed layer of the second protective layer can be processed with 600° C. to 800° C. to form the second protective layer and remove the plastic material. Therefore, said perforations of the phosphate salt layer can be filled in for protecting the electrical device body and/or the electrodes more preferably.

Alternatively, the second protective layer can be formed directly after the first protective layer was formed, and then the pre-formed layer of the first protective layer and the pre-formed layer of the second protective layer can be processed with 600° C. to 800° C. to form the first protective layer and the second protective layer and remove the plastic material Furthermore, after performing the step S14 electroplating can be performed on the exposed outer surfaces of the electrodes in order to form a surface electrode structure on at least one said electrode(s). And the surface electrode structure can be at least one bottom-plated layer and at least one solder layer from outside to inside in order. Alternatively, the surface electrode structure, for example, can from inside to outside be a first conductive layer of silver (Ag), a second conductive layer of nickel (Ni) and a third conductive layer of tin (Sn), but the prevent invention is not limited to this. Specifically, the silver layer can be formed on the electrodes by electroplating, then in order to increase binding force between the silver layer and the tin layer, the nickel layer covering the silver layer can be formed and the tin layer covering the nickel layer can be formed then. Otherwise, a first conductive layer can be a silver layer through surface roughening by acid washing. And the bottom-plated layer and the solder layer of the surface electrode structure can be manufactured through electroless plating, brush plating or barrel plating.

Figure 2:
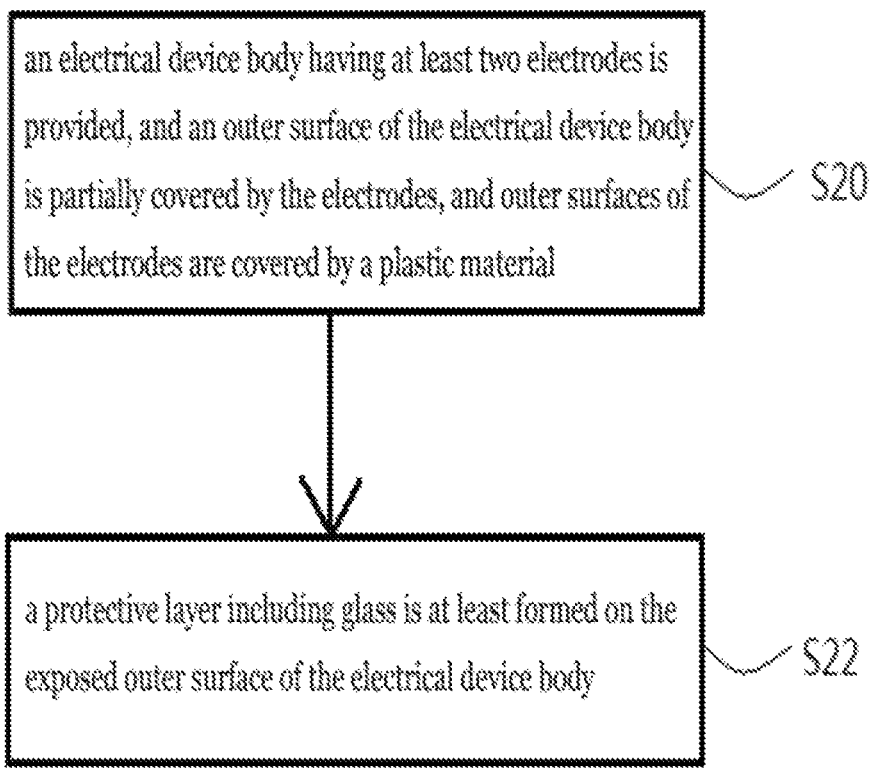
FIG. 2 is a flow diagram illustrating another embodiment of a manufacturing method for electrical device package structure of the present invention.

The present invention can further provide another manufacturing method for electrical device package structure, which includes a step S20 to a step S22 shown in FIG. 2. In the step S20, an electrical device body having at least two electrodes can be provided, and an outer surface of the electrical device body is partially covered by the electrodes, and outer surfaces of the electrodes are covered by a plastic material. In the step S22, a protective layer including glass can at least be formed on the exposed outer surface of the electrical device body. After performing the step S22, the plastic material can be removed. Particularly, after a pre-formed layer of the protective layer is formed through dipping, spraying, coating, spin coating or combination thereof by a solution including glass, the pre-formed layer of the protective layer can be processed with 600° C. to 800° C. to form the protective layer and remove the plastic material. Therefore, in the prevent invention the burning process with 600° C. to 800° C. can be performed to stick inorganic glass on the surface of the electrical device body, while burning the plastic material to be removed in the burning process so as to open the electrodes and expose inner electrodes.

Samely, after performing the step S22 electroplating can be performed on the exposed outer surfaces of the electrodes in order to form a surface electrode structure on at least one said electrode(s). As for other details of this another manufacturing method for electrical device package structure, they have already been provided above and thus omitted herein for conciseness.

Figure 3:
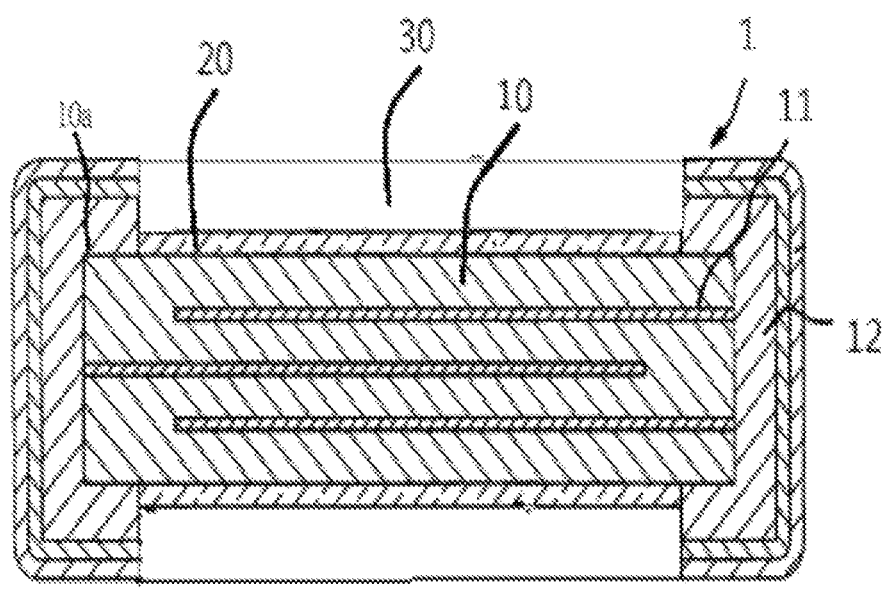
FIG. 3 is a schematic drawing of an electrical device package structure of the present invention.

The present invention can provide an electrical device package structure 1 as shown in FIG. 3. It includes an electrical device body 10, a first protective layer including phosphate salt 20 and a second protective layer including glass 30. As described above, the electrical device body 10 can have at least two electrodes 11 which partially cover an outer surface 10a of the electrical device body 10, and the first protective layer including phosphate salt 20 can at least be partially formed on the surface uncovered by electrodes 11 of the electrical device body 10, and the second protective layer including glass 30 can be formed on the first protective layer 20. Otherwise, a surface electrode structure 12 can be formed on at least one electrode 11.

Figure 4:
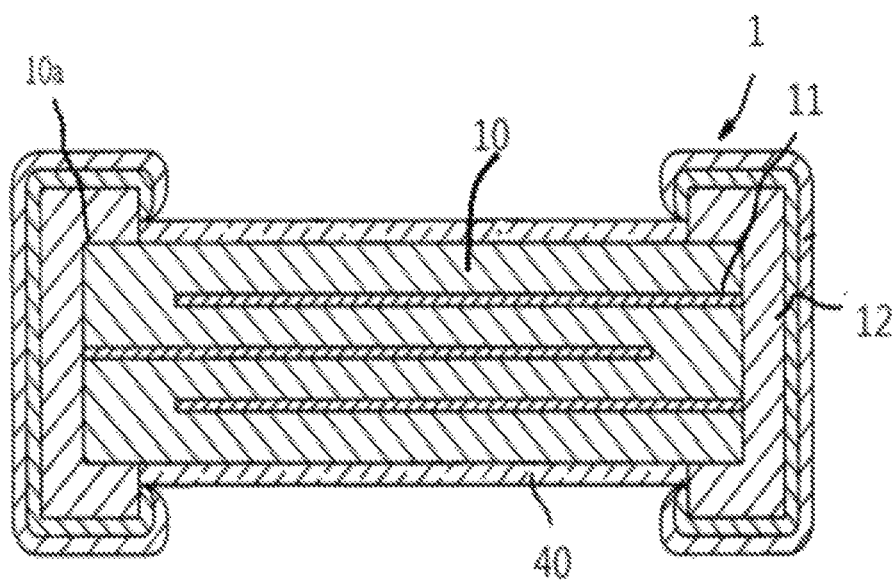
FIG. 4 is a schematic drawing of another embodiment of an electrical device package structure of the present invention.

The present invention can further provide another electrical device package structure 1 as shown in FIG. 4. It includes an electrical device body 10 having at least two electrodes 11 which partially cover an outer surface of the electrical device body 10. It also includes a protective layer including glass 40 which is at least partially formed on the surface uncovered by electrodes 11 of the electrical device body 10. Otherwise, a surface electrode structure 12 can be formed on at least one electrode 11.

As for details about material and process of aforementioned two electrical device package structures, they have already been provided above and thus omitted herein for conciseness.

In conclusion, the present invention can form the protective layer including glass formed on the protective layer including phosphate salt to fill in perforations of the phosphate salt layer, so that preferable protection can be provided for the electrical device body and/or the electrodes, and the protective layer including glass sticking to the electrical device body can also provide better protection for the electrical device body and/or the electrodes. Otherwise, the plastic material can provide protection for the electrodes and avoid forming a high impedance layer on an electrode when forming each protective layer, and that can be easily removed when performing thermal treatment.

The present invention has been disclosed in the preferred embodiment above. However, it can be appreciated by one of ordinary skill in the art that these embodiments are illustrative rather than limitations of the scope of the present invention. It should be noted that the above embodiments can be modified and replaced with equivalents thereof without departing from the scope of the present invention. Therefore, the scope claimed of the present invention should only be defined by the following claims.

What is claimed is:

1. A manufacturing method for electrical device package structure, comprising:

providing an electrical device body having at least two electrodes, wherein an outer surface of the electrical device body is partially covered by the electrodes, and outer surfaces of the electrodes are covered by a plastic material;

forming a first protective layer including phosphate salt at least on the exposed outer surface of the electrical device body; and forming a second protective layer including glass at least on an exposed outer surface of the first protective layer.

2. The manufacturing method for electrical device package structure according to claim 1, further comprising after forming the first protective layer including phosphate salt at least on the exposed outer surface of the electrical device body, removing the plastic material.

3. The manufacturing method for electrical device package structure according to claim 2, further comprising after forming the second protective layer including glass at least on the exposed outer surface of the first protective layer, performing electroplating on the exposed outer surfaces of the electrodes.

4. The manufacturing method for electrical device package structure according to claim 1, wherein a pre-formed layer of the first protective layer is formed through dipping, spraying, coating or combination thereof by a solution including phosphate salt.

5. The manufacturing method for electrical device package structure according to claim 1, wherein a pre-formed layer of the second protective layer is formed through dipping, spraying, coating, spin coating or combination thereof by a solution including glass.

6. The manufacturing method for electrical device package structure according to claim 1, wherein the phosphate salt is at least one of phosphate, zinc phosphate, iron phosphate and manganese phosphate.

7. A manufacturing method for electrical device package structure, comprising:
providing an electrical device body having at least two electrodes, wherein an outer surface of the electrical device body is partially covered by the electrodes, and outer surfaces of the electrodes are covered by a plastic material; and
forming a protective layer including glass at least on the exposed outer surface of the electrical device body.

8. The manufacturing method for electrical device package structure according to claim 7, further comprising after forming the protective layer including glass at least on the exposed outer surface of the electrical device body, removing the plastic material.

9. The manufacturing method for electrical device package structure according to claim 8, wherein after forming a pre-formed layer of the protective layer through dipping, spraying, coating, spin coating or combination thereof by a solution including glass, the pre-formed layer of the protective layer is processed with 600° C. to 800° C. to form the protective layer and remove the plastic material.

10. The manufacturing method for electrical device package structure according to claim 1, wherein the glass is at least one of silicate glass, aluminum silicate glass, borate glass, phosphate glass and plumbate glass.

11. An electrical device package structure, comprising:
an electrical device body having at least two electrodes which partially cover an outer surface of the electrical device body;
a first protective layer including phosphate salt, which is at least partially formed on the surface uncovered by the electrodes of the electrical device body; and
a second protective layer including glass, which is formed on the first protective layer.

12. An electrical device package structure according to claim 11, further comprising a surface electrode structure formed on at least one of the electrodes.

13. The manufacturing method for electrical device package structure according to claim 7, wherein the glass is at least one of silicate glass, aluminum silicate glass, borate glass, phosphate glass and plumbate glass.

\* \* \* \* \*